United States Patent
Jordan et al.

(10) Patent No.: US 11,371,622 B2
(45) Date of Patent: *Jun. 28, 2022

(54) EXCESS FLOW VALVE ASSEMBLIES

(71) Applicant: Hubbell Incorporated, Shelton, CT (US)

(72) Inventors: David Scott Jordan, Tulsa, OK (US); David Carl Wartluft, Broken Arrow, OK (US); Brian Anthony McKaskle, Tulsa, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/032,967

(22) Filed: Sep. 25, 2020

(65) Prior Publication Data

US 2021/0018108 A1  Jan. 21, 2021

Related U.S. Application Data

(63) Continuation of application No. 16/038,584, filed on Jul. 18, 2018, now Pat. No. 10,788,138.

(60) Provisional application No. 62/534,933, filed on Jul. 20, 2017.

(51) Int. Cl.
*F16K 17/28* (2006.01)
*F17C 13/04* (2006.01)

(52) U.S. Cl.
CPC ............. *F16K 17/28* (2013.01); *F17C 13/04* (2013.01); *F17C 2205/0332* (2013.01)

(58) Field of Classification Search
CPC ... F16K 17/28; F17C 13/04; F17C 2205/0332
USPC ........................................................... 138/99
See application file for complete search history.

(56) References Cited

U.S. PATENT DOCUMENTS

| | | | | |
|---|---|---|---|---|
| 2,591,060 A | ‡ | 4/1952 | Garretson | F16K 17/30 137/513.3 |
| 3,032,067 A | ‡ | 5/1962 | Johnson | F16K 27/02 137/630 |
| 3,469,605 A | ‡ | 9/1969 | Courtot | F16K 17/30 137/630 |
| 3,516,434 A | ‡ | 6/1970 | Noss | F16K 15/063 137/514.5 |
| 3,872,884 A | ‡ | 3/1975 | Busdiecker | F16K 17/30 137/498 |
| 4,958,657 A | ‡ | 9/1990 | Hagan | F16K 17/30 137/51 |

(Continued)

FOREIGN PATENT DOCUMENTS

EP         2020546     ‡   6/2011

OTHER PUBLICATIONS

International Report on Patentability mailed in PCT/US2018/042632 dated Jan. 30, 2020.‡

(Continued)

*Primary Examiner* — Craig M Schneider
*Assistant Examiner* — David R Deal
(74) *Attorney, Agent, or Firm* — Wissing Miller LLP

(57) ABSTRACT

An excess flow valve assembly includes a gas pipe, an excess flow valve and a collar crimped to an outside of a portion of the gas pipe, the crimped collar compressing the portion of the gas pipe creating a positive stop for the excess flow valve when the excess flow valve is inserted in the gas pipe.

20 Claims, 7 Drawing Sheets

(56) References Cited

U.S. PATENT DOCUMENTS

| | | | | |
|---|---|---|---|---|
| 5,203,365 A ‡ | 4/1993 | Velie | ............... | F16K 17/34 |
| | | | | 137/45 |
| 5,357,998 A ‡ | 10/1994 | Abrams | ............... | F16L 55/005 |
| | | | | 137/61 |
| 5,465,751 A ‡ | 11/1995 | Newton | ............... | F16K 17/30 |
| | | | | 137/49 |
| 5,613,518 A ‡ | 3/1997 | Rakieski | ............... | F16K 17/30 |
| | | | | 137/51 |
| 5,704,391 A ‡ | 1/1998 | McGowan, Jr. | ............... | F16K 17/12 |
| | | | | 137/45 |
| 7,350,826 B2 ‡ | 4/2008 | Cantrell et al. | ............... | F16L 25/0036 |
| | | | | 138/121 |
| 7,533,689 B2 ‡ | 5/2009 | Goble | ............... | F16K 17/28 |
| | | | | 137/15 |
| 7,562,668 B2 ‡ | 7/2009 | Mackay-Smith | ............... | F16K 17/30 |
| | | | | 137/15 |
| 8,020,582 B2 ‡ | 9/2011 | Lea-Wilson | ............... | F16K 17/30 |
| | | | | 137/46 |
| 8,123,257 B1 ‡ | 2/2012 | Baer | ............... | F16L 33/2073 |
| | | | | 285/25 |
| 8,640,733 B1 ‡ | 2/2014 | Lenn | ............... | F16K 17/28 |
| | | | | 137/51 |
| 8,776,826 B2 ‡ | 7/2014 | Mackay-Smith | ............... | F16K 17/30 |
| | | | | 137/31 |
| 10,788,138 B2 * | 9/2020 | Jordan | ............... | F16K 17/28 |
| 2005/0045239 A1 ‡ | 3/2005 | Krieger | ............... | B62D 5/062 |
| | | | | 138/44 |
| 2007/0277885 A1 ‡ | 12/2007 | Goble | ............... | F16K 17/28 |
| | | | | 137/51 |
| 2008/0178946 A1 ‡ | 7/2008 | Lea-Wilson | ............... | F16K 17/30 |
| | | | | 137/460 |
| 2010/0108160 A1 ‡ | 5/2010 | Eichler | ............... | F16K 17/30 |
| | | | | 137/49 |
| 2013/0327432 A1 ‡ | 12/2013 | McMurray | ............... | F16L 25/0072 |
| | | | | 138/109 |
| 2015/0000769 A1 ‡ | 1/2015 | Gao | ............... | F16K 17/30 |
| | | | | 137/512.3 |
| 2015/0219232 A1 ‡ | 8/2015 | Dominguez | ............... | F16K 17/28 |
| | | | | 137/2 |
| 2016/0033051 A1 ‡ | 2/2016 | Barbato | ............... | A01C 23/024 |
| | | | | 137/498 |

OTHER PUBLICATIONS

International Search Report and Written Opinion mailed PCT/US18/42632 dated Oct. 10, 2018 (6 pages).‡

\* cited by examiner
‡ imported from a related application

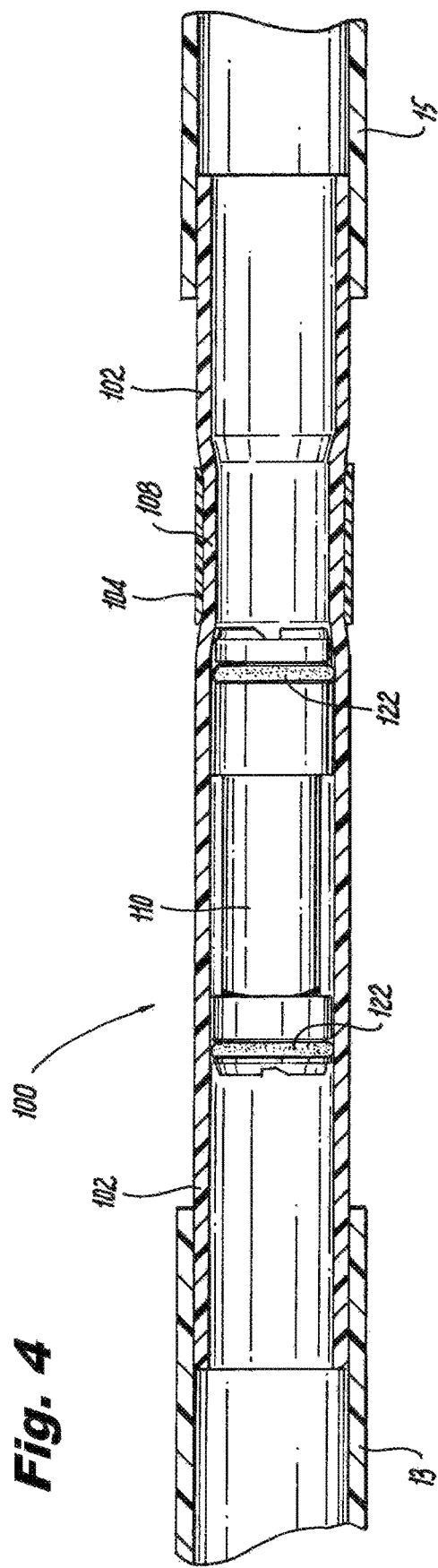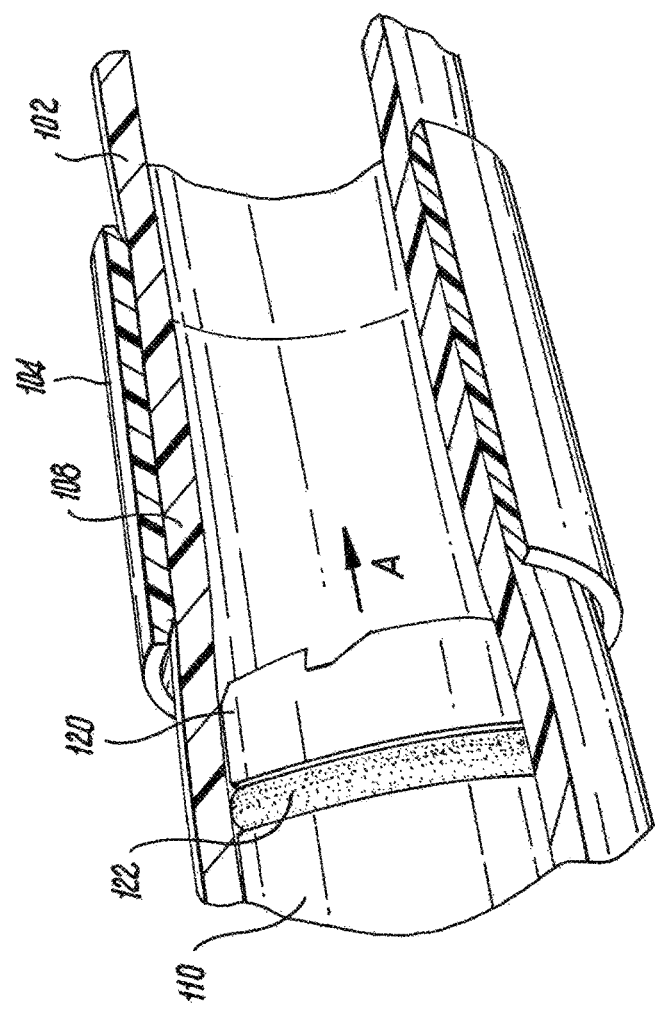

EXCESS FLOW VALVE ASSEMBLIES

CROSS-REFERENCE TO RELATED APPLICATIONS

This application is a continuation of application Ser. No. 16/038,584 filed on Jul. 18, 2018, and claims benefit from U.S. Provisional Patent Application Ser. No. 62/534,933, filed Jul. 20, 2017 the entire contents of both are incorporated herein by reference.

BACKGROUND

Field

The present disclosure relates to excess flow valves and, more particularly, to excess flow valve assemblies.

Description of the Related Art

For convenience and safety, a gas main supplying natural gas may run under a paved roadway where it can be tapped to provide natural gas to one or more businesses or residences along the roadway. As shown in FIG. 1, a gas main 10 is buried in the ground 11 and may be tapped with a tee 12. A run of gas pipe 14 extends from the tee 12 to a gas meter/regulator 18 mounted to a commercial building or residence 16. For cost and convenience purposes, plastic (e.g., polyethylene) pipe may be used for the gas pipe 14 extending from the tee 12 to the gas meter/regulator 18. Although plastic pipe 14 is rather durable, there may be instances where the integrity of the pipe 14 may be compromised. Accordingly, provisions are generally made to maintain the integrity of the gas pipe 14. For example, in areas where underground gas lines exist, utilities and home or business owners performing work requiring digging in the ground are urged to obtain information from the gas utility indicating exactly where the gas pipe 14 runs, in order to avoid damaging the pipe 14. Unfortunately, accidents and/or natural events may still occur which can compromise the integrity of the gas pipe 14. For example, if for some reason the gas utility is not contacted to obtain the location of a gas pipe 14, excavation 20, directional drilling and/or post hole digging 22 may cause damage to the gas pipe 14. In addition, earthquakes and/or settling 24 of the ground 11 can damage the gas pipe 14. The integrity of the gas pipe 14 and/or gas meter/regulator 18 may also be compromised above ground by accidental regulator 18 and/or service line failure or damage caused by an impact from a vehicle 26.

An excess flow valve is a safety device installed in plastic pipe to limit the amount of natural gas leaked to atmosphere if the integrity of the gas pipe 14 is compromised downstream of the excess flow valve. The excess flow valve is a self-actuating valve that automatically closes when gas flow exceeds a predetermined rate. Depending on its configuration, the excess flow valve may automatically reset or may require manual reset once the source of the gas leak is repaired. To be effective, it is important to maintain the excess flow valve at a desired position within the pipe 14 to prevent the excess flow valve from moving downstream and reducing the protected pipe length. Generally, the excess flow valve is provided as close to the tee 12 as possible, so that substantially the entire length of the gas pipe 14 is protected. Since the excess flow valve is provided within the pressurized gas pipe, the excess flow valve should be prevented from moving downstream within the gas pipe 14.

One method of preventing the excess flow valve from moving within the gas pipe 14 is to provide a butt fusion joint between two pieces of plastic (e.g., polyethylene) pipe. Such a butt fusion joint provides a positive stop within the pipe 14 at the joint, preventing the excess flow valve from mowing downstream. Another method of preventing movement of the excess flow valve is to rely on an interference fit between the plastic pipe 14 and the excess flow valve. Such an interference fit can be achieved by making the excess flow valve larger in diameter than the free state inner diameter of the plastic pipe 14 and press fitting the excess flow valve into the plastic pipe 14 causing the pipe 14 to expand. In addition, ridges may be provided on the excess flow valve and the pipe 14 containing the excess flow valve may be passed through a reducer during production to limit movement of the excess flow valve.

The excess flow valve assemblies according to the present disclosure have a positive stop retention system that does not rely on a butt fusion joint or an interference fit.

SUMMARY

An excess flow valve assembly includes a gas pipe, an excess flow valve and a collar crimped to an outside of a portion of the gas pipe, the crimped collar compressing the portion of the gas pipe creating a positive stop for the excess flow valve when the excess flow valve is inserted in the gas pipe.

A gas pipe for an excess flow valve includes a section of deformable gas pipe having an inner diameter and a deformable collar having an inner diameter dimensioned to fit over the deformable gas pipe, wherein when the deformable collar is deformed inwardly, the inner diameter of the deformable gas pipe is reduced to provide a positive stop for the excess flow valve.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 depicts a cross-sectional view of a portion of an excess flow valve assembly according to an illustrative embodiment of the present disclosure;

FIG. 5 depicts an enlarged view of a portion of an excess flow valve assembly according to an illustrative embodiment of the present disclosure;

DETAILED DESCRIPTION

Illustrative embodiments of the present disclosure may be provided as improvements to excess flow valve assemblies.

For example, an excess flow valve assembly according to an illustrative embodiment of the present disclosure includes a collar that is crimped to a gas pipe for reducing an inner diameter of a portion of the gas pipe creating a positive stop for the excess flow valve.

Illustrative embodiments of the present disclosure provide an excess flow valve assembly including a deformable gas pipe with a positive stop for an excess flow valve without creating hoop stress on the gas pipe.

Illustrative embodiments of the present disclosure provide a deformable collar for an excess flow valve assembly, the deformable collar capable of deforming an inner diameter of a gas pipe creating a positive stop for an excess flow valve.

Figure 1:
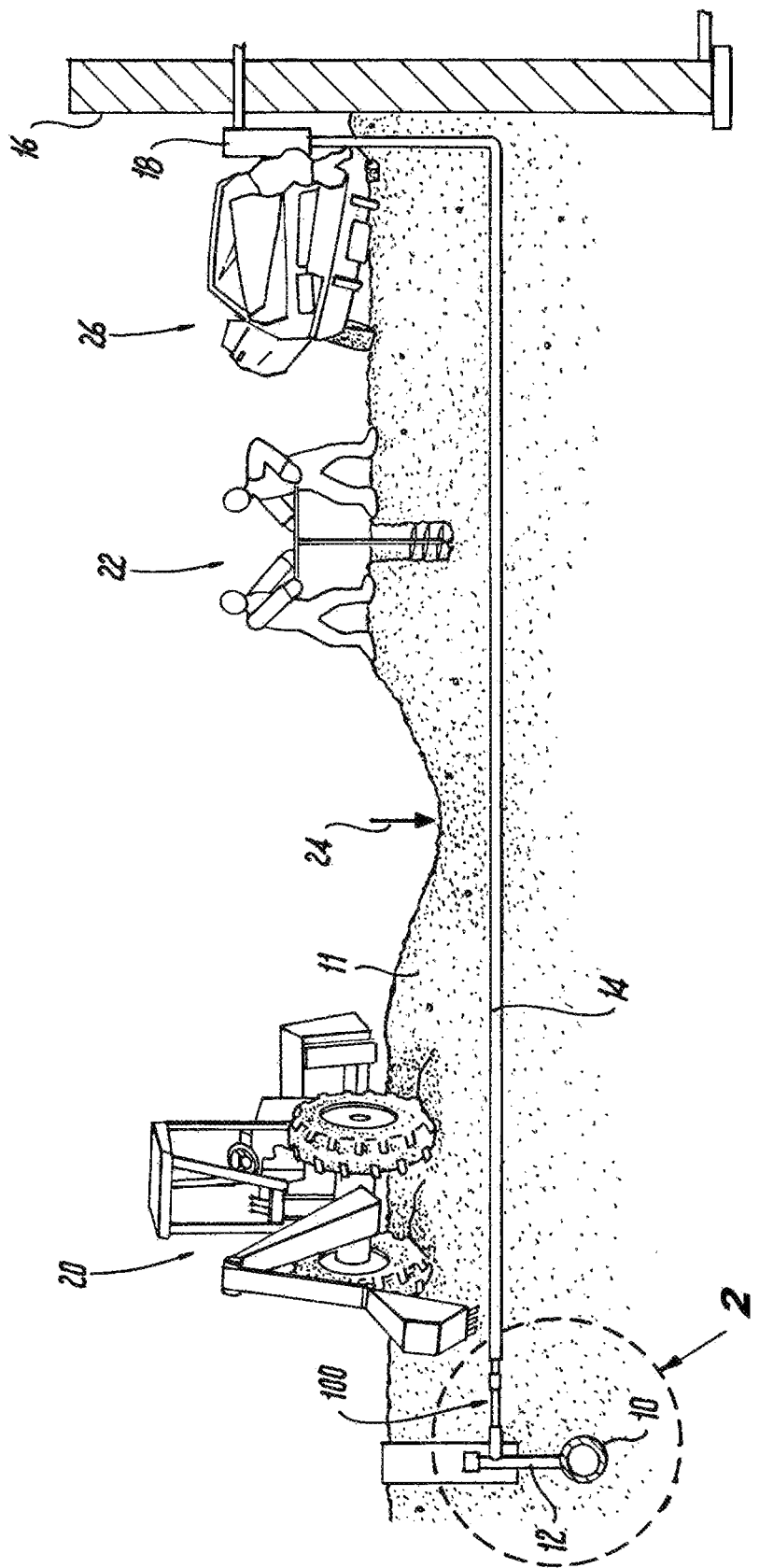
FIG. 1 depicts an environment of a gas line service for describing illustrative embodiments of the present disclosure.
Figure 2:
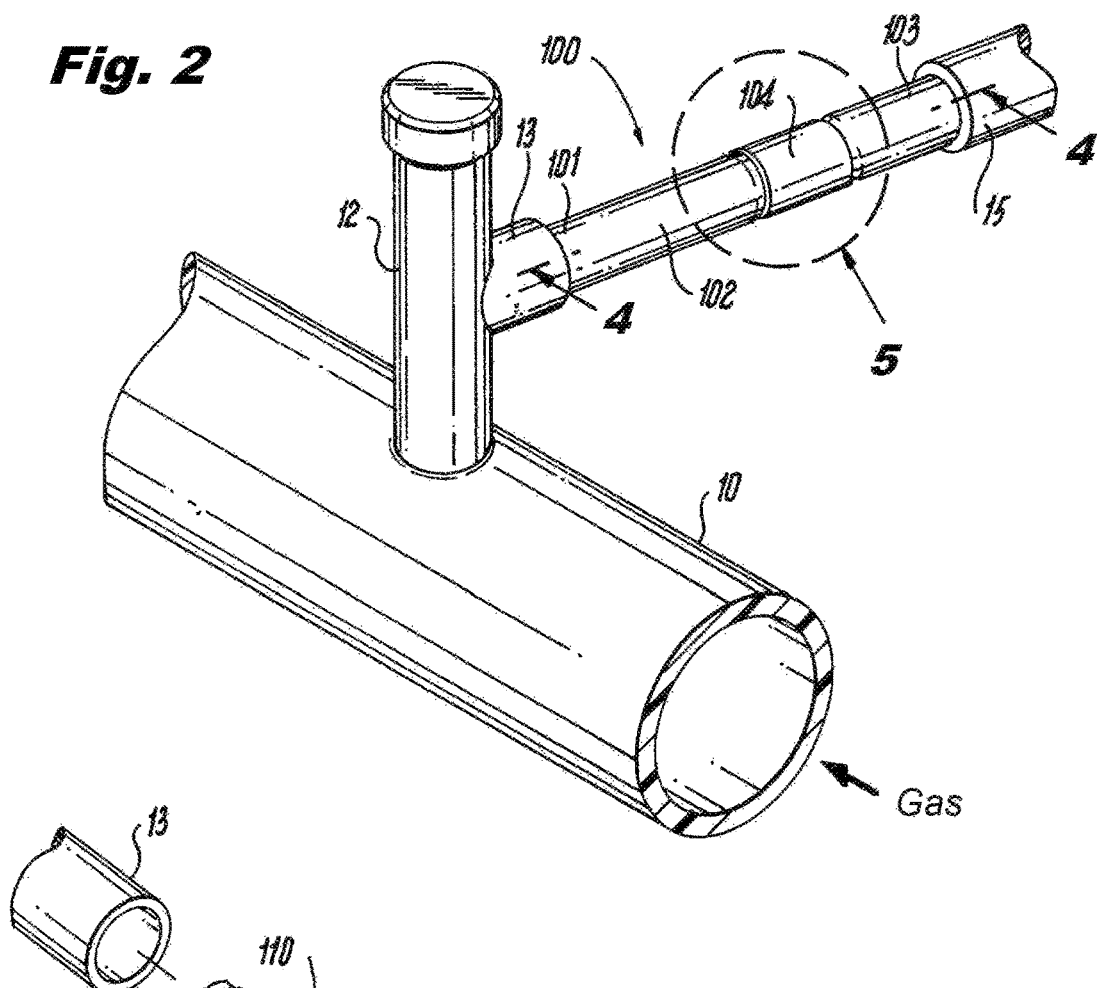
FIG. 2 depicts an enlarged view of a portion 2 of FIG. 1 for describing illustrative embodiments of the present disclosure.

An excess flow valve (EFV) assembly according to an illustrative embodiment of the present disclosure is shown in FIGS. 2-5 and is referred to generally as EFV assembly 100. As shown in FIG. 1, EFV assembly 100 is provided between gas main 10 and gas meter/regulator 18. Preferably, EFV assembly 100 is provided as close to gas main 10 as possible in order to protect as much of gas pipe 14 as possible. Of course, it will be appreciated that EFV assembly 100 may be provided anywhere along gas pipe 14 as desired and/or as suitable for a particular purpose. As shown in more detail in FIG. 2, an end 101 of a gas pipe 102 forming part of EFV assembly 100 is fitted into sleeve 13 extending from tee 12. The other end 103 of pipe 102 is fitted into end 15 of pipe 14. Although pipe 102 is depicted as having a smaller diameter than sleeve 13 and gas pipe 14, it will be appreciated that pipe 102 may have the same or larger diameter than sleeve 13 and/or gas pipe 14. EFV assembly 100 may be affixed to pipe 14 and sleeve 13 utilizing any of various suitable types of mechanisms. For example, collar connectors, butt fusion unions and compression fittings, etc. may be utilized for connecting EFV assembly 100.

Figure 3:
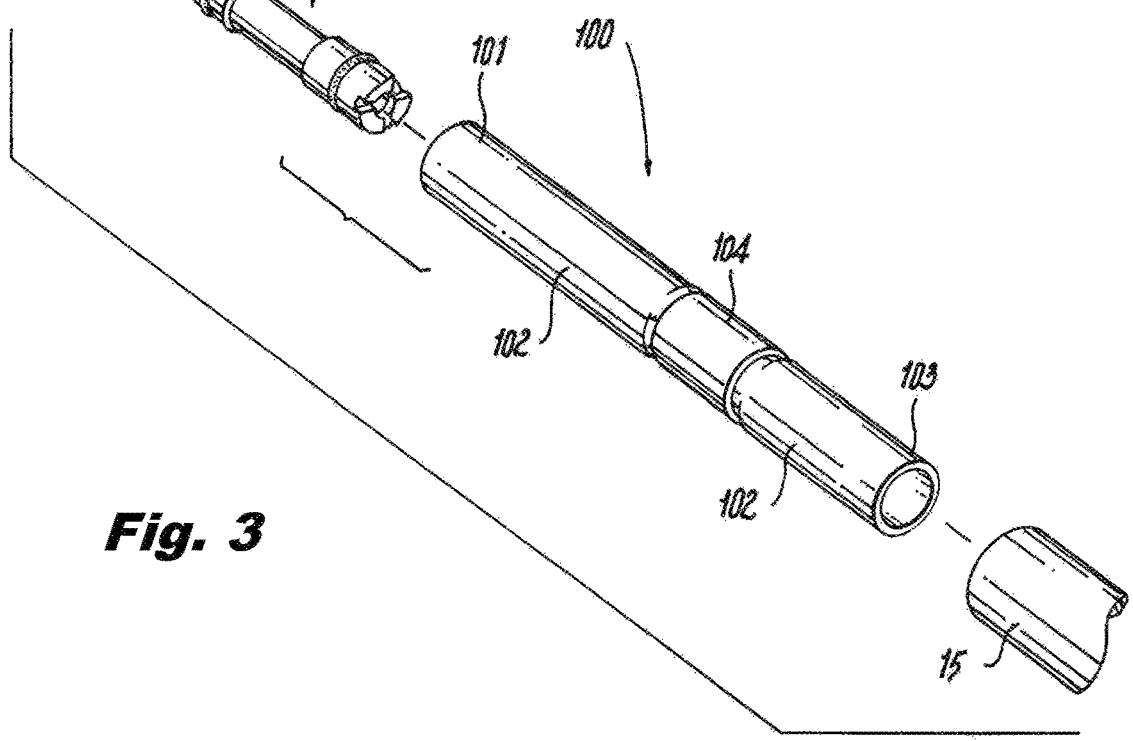
FIG. 3 depicts an exploded view of an excess flow valve assembly according to an illustrative embodiment of the present disclosure.

As shown in FIG. 3, EFV assembly 100 includes a section of pipe 102, a collar 104 and an excess flow valve 110. Collar 104 is crimped around the outside of the pipe 102. Excess flow valve 110 has an outer diameter slightly smaller than a free state inner diameter of pipe 102. Excess flow valve 110 is inserted into pipe 102 until it abuts the section of pipe 108 below crimped collar 104 as shown in FIG. 4. Excess flow valve 110 includes one or more O-rings 122 extending around the periphery for providing a gas seal between pipe 102 and excess flow valve 110 for preventing gas from bypassing excess flow valve 110. The internal components and workings of excess flow valve 110 are well known in the art and will therefore not be described in detail herein.

As shown in more detail in the enlarged view depicted in FIG. 5, when collar 104 is crimped around pipe 102, the portion of pipe 108 immediately below collar 104 is compressed slightly, such that the inner diameter of the portion of pipe 108 is slightly smaller than an outer diameter of excess flow valve 110. Excess flow valve 110 is thus prevented from moving further downstream in the direction of arrow A. The compressed portion 108 of pipe 102 formed by crimped collar 104 has a reduced inner diameter and creates a positive stop for the excess flow valve 110. Since a compressive force is being placed on pipe 102 by crimped collar 104, no hoop stress is placed on pipe 102.

Figure 6A:
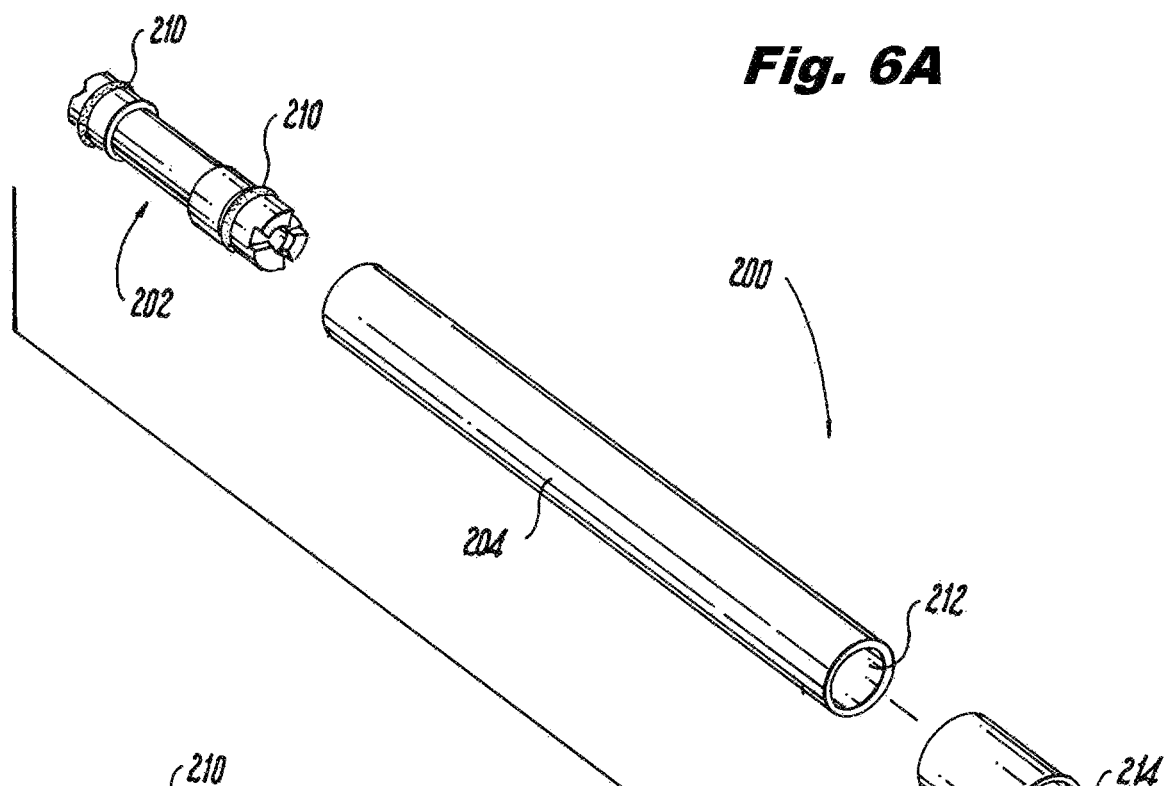
FIGS. 6A-6D depict various views of an excess flow valve assembly during an assembly process according to an illustrative embodiment of the present disclosure.
Figure 6B:
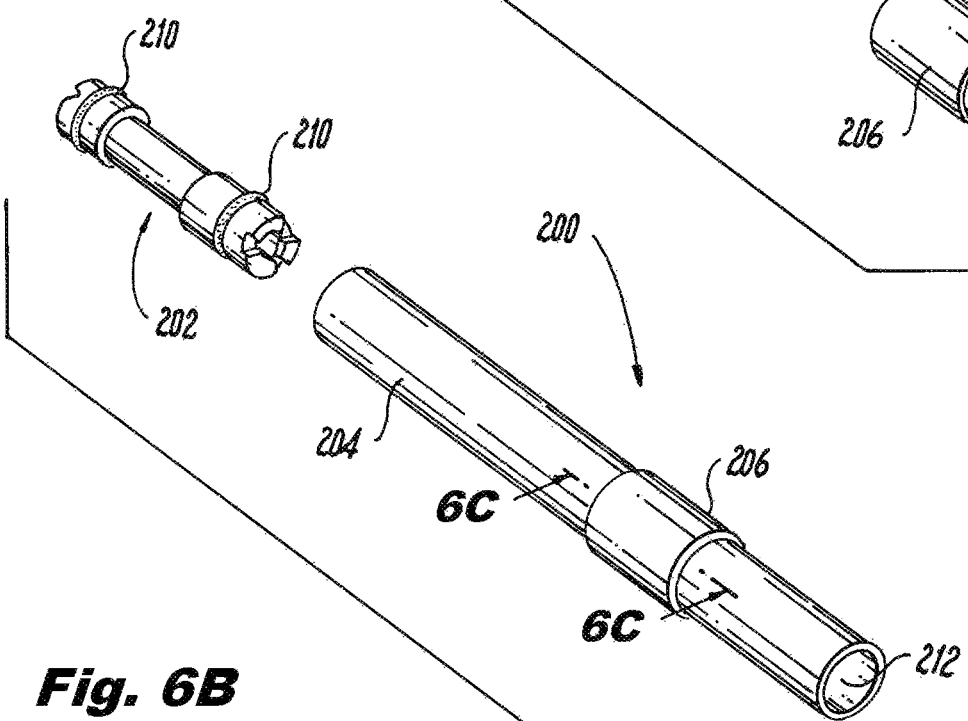
Figure 6C:
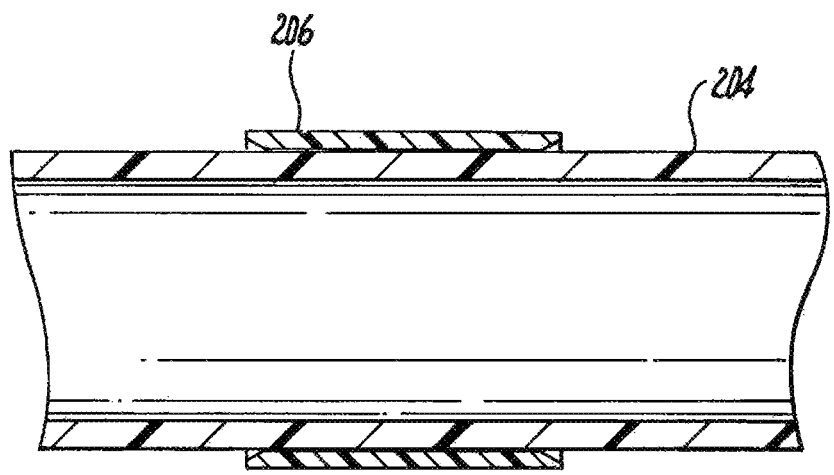
Figure 6D:
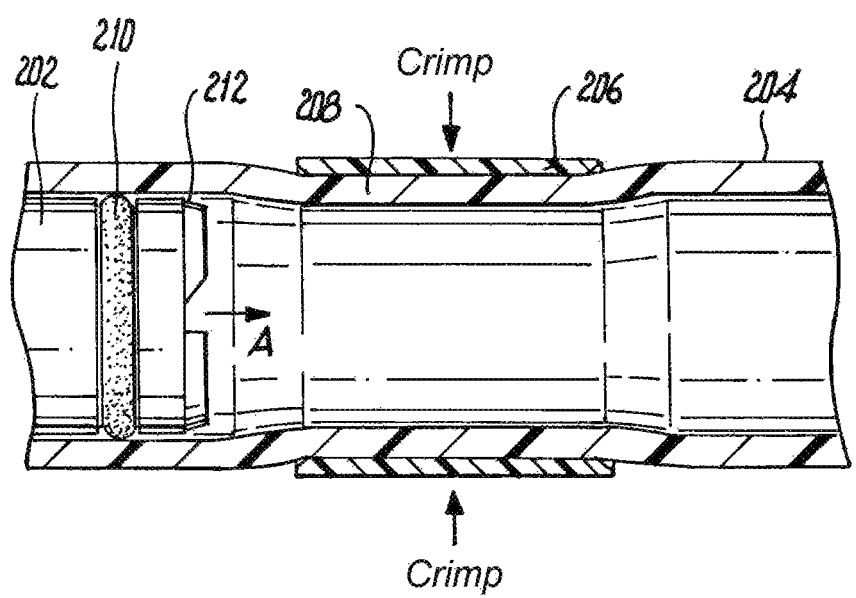

An excess flow valve assembly according to an embodiment of the present disclosure is shown in FIGS. 6A-6D and is referred to herein generally as EFV assembly 200. EFV assemblies 200 are sometimes referred to as EFV Sticks. EFV assembly 200 includes an excess flow valve 202, a pipe section 204 and a collar 206. Excess flow valve 202 includes one or more portions 210 having an outer diameter slightly smaller than a free state diameter of inner portion 212 of pipe section 204. For example, according to an illustrative embodiment of the present disclosure, portions 210 of excess flow valve 202 include O-rings dimensioned to provide a gas-tight seal around excess flow valve 202 when excess flow valve 202 is inserted in pipe section 204. This gas-tight seal prevents gas from by-passing excess flow valve 202. According to an illustrative embodiment of the present disclosure, collar 206 is substantially cylindrical and has an inner diameter 214 slightly larger than an outer diameter of pipe section 204. Collar 206 is thus capable of being slid onto pipe section 204 and positioned as desired on pipe section 204 (e.g., see FIG. 6C). Collar 206 is crimped in place as shown in FIG. 6D. Crimped collar 206 causes the portion 208 of pipe section 204 below the crimped collar 206 to have a reduced inner diameter compared to the remaining portions of pipe section 204. During assembly, excess flow valve 202 may be inserted into pipe section 204 prior to or after crimping of collar 206. The reduced diameter portion 208 of pipe section 204 prevents excess flow valve 202 from moving downstream (see arrow A in FIG. 6D). Any suitable crimping tool or machine may be utilized to crimp collar 206. Such crimping tools and machines are well known in the art and will not be described in further detail.

Although the collars described in the above illustrative embodiments of the present disclosure are described as generally cylindrical, it will be appreciated the collars may take forms other than that shown and may be provided in various shapes and configurations. For example, a collar may be provided that can be crimped on only a portion of its circumference so that only a portion of the inner diameter of the gas pipe below the collar is inwardly displaced. The inwardly displaced portion of the gas pipe will provide a positive stop for preventing movement of the excess flow valve in the downstream direction. Non-limiting illustrative embodiments of various shapes and configurations of collars are described below by reference to FIGS. 7A-7H.

Figure 7A:
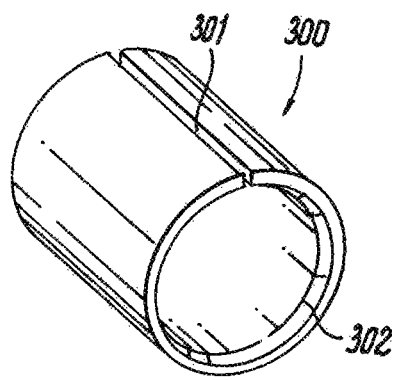
FIGS. 7A-7I depict various configurations of collars for use with excess flow valve assemblies according to illustrative embodiments of the present disclosure.
Figure 7B:
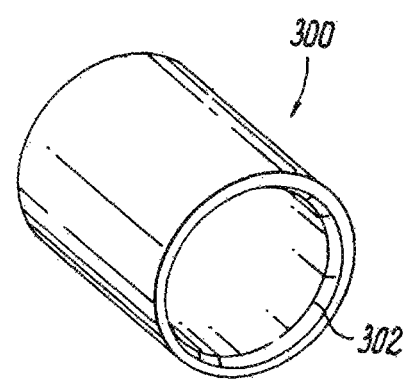
Figure 7C:
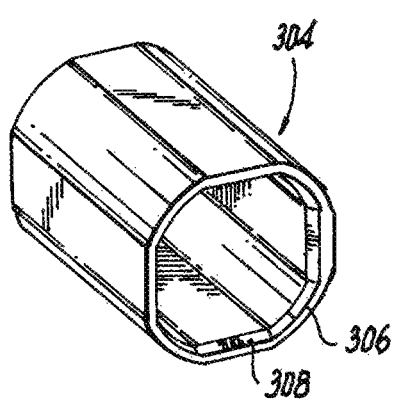
Figure 7D:
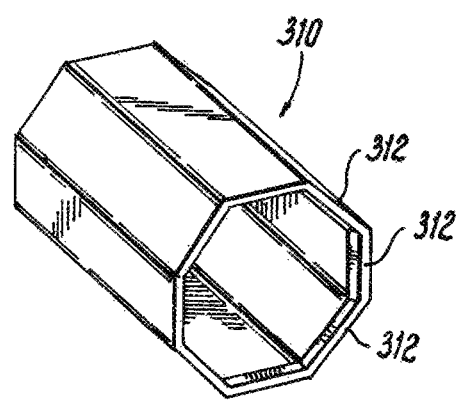
Figure 7E:
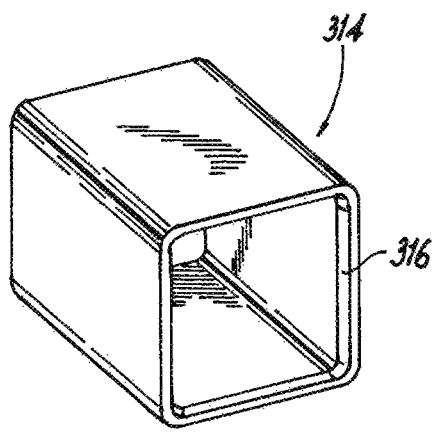
Figure 7F:
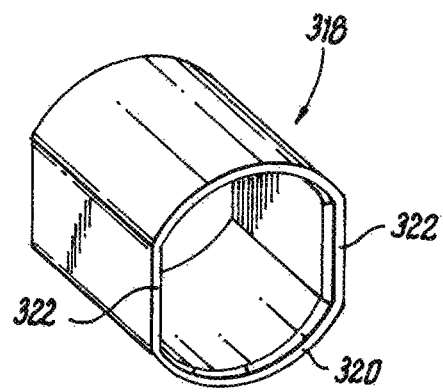
Figure 7G:
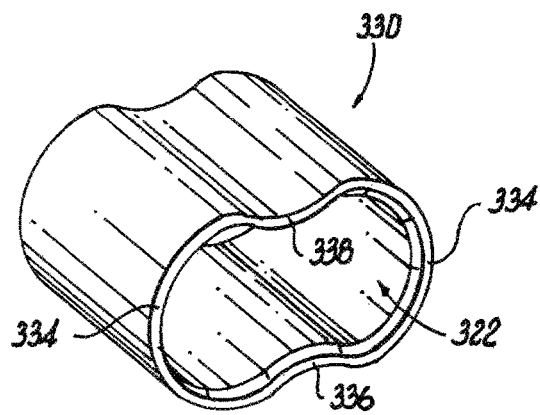
Figure 7H:
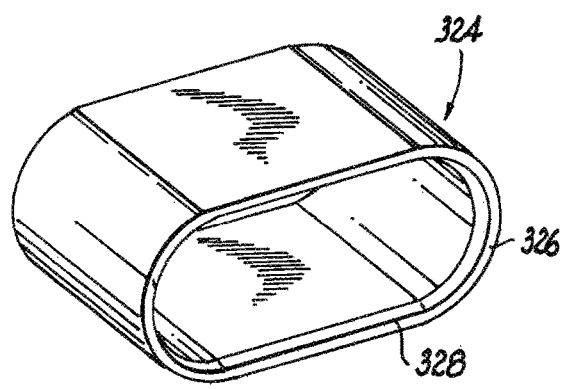
Figure 7I:
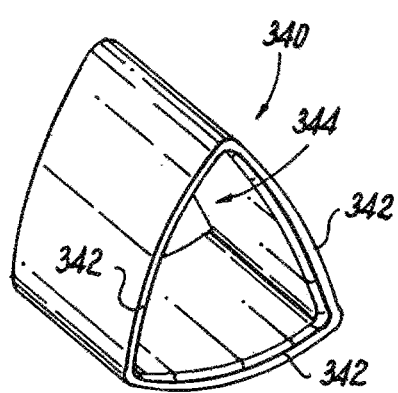

FIG. 7A depicts a collar 300 according to an illustrative embodiment of the present disclosure. Collar 300 includes a slit 301 extending along its length. By spreading collar 300 at the slit 301, the inside diameter 302 of collar 300 may be adjusted for use on various diameter gas pipes. FIG. 7B depicts another illustrative embodiment of a collar 300 that is similar to the collar of FIG. 7A except that the collar 300 does not include a slit extending along its length. When crimped, collar 300 provides substantially even compression along the circumference of the gas pipe. According to an illustrative embodiment of the present disclosure as shown in FIG. 7C, collar 304 has eight surfaces including four substantially flat surface sections 308 and four curved surface sections 306. A crimping tool may be utilized to crimp one or more of the surfaces 306 and 308. According to another illustrative embodiment of the present disclosure as shown in FIG. 7D, collar 310 has eight substantially flat surfaces 312. A crimping tool may be provided to crimp one or more of the surfaces 312. According to an illustrative embodiment of the present disclosure as shown in FIG. 7E, collar 314 has four substantially flat surfaces 316. A crimping tool may be provided to crimp one or more of the surfaces 316. According to another illustrative embodiment of the present disclosure as shown in FIG. 7F, collar 318 has two substantially flat surfaces 322 and two substantially curved surfaces 320. A crimping tool may be arranged to crimp one or more of the surfaces 320 and 322. A collar 324 according to another illustrative embodiment of the present disclosure is shown in FIG. 7H. Collar 324 has two substantially flat elongated opposing surfaces 328 and two substantially curved opposing surfaces 326. According to this illustrative embodiment of the present disclosure, a crimping tool may be provided to crimp one or both of opposing surfaces 328. A collar 330 according to another illustrative embodiment of the present disclosure is shown in FIG. 7G. Collar 330 includes opposing concave surfaces 336, 338 and opposing convex surfaces 334. A crimping tool may be provided to crimp one or more of the surfaces 334, 336 and/or 338. According to another illustrative embodiment of the present disclosure as shown in FIG. 7I, a collar 340 includes three evenly dimensioned curved surfaces 342. The inner area 344 of collar 340 is dimensioned to receive a gas pipe of suitable diameter. A crimping tool may be provided to crimp one or more of surfaces 342. The collars described herein may be formed from any suitable type of material including steel, stainless steel, copper, brass, aluminum, etc.

The gas pipes and sections of gas pipe described herein are generally plastic and more particularly, polyethylene. However, it will be appreciated that the gas pipe may be made of any suitable material or materials capable of being inwardly deformed when a collar is crimped thereon, while maintaining the integrity of the gas pipe.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An excess flow valve assembly comprising:
an excess flow valve adapted to be inserted into a gas pipe; and
a collar having a length that is less than a length of the gas pipe and an outer wall with an inside surface defining a hollow center portion configured to fit around an outer surface of a portion of the gas pipe, the outer wall being deformable so that when deformed a diameter of the outer surface of the gas pipe in contact with an inside surface of the outer wall of the collar is reduced to provide a positive stop for the excess flow valve when the excess flow valve is inserted in the gas pipe.

2. The excess flow valve assembly according to claim 1, wherein the outer wall of the collar has a continuous substantially circular cross-section.

3. The excess flow valve assembly according to claim 1, wherein the outer wall of the collar has a discontinuous circular cross-section.

4. The excess flow valve assembly according to claim 1, wherein the outer wall of the collar has at least one flat wall and at least one curved wall.

5. The excess flow valve assembly according to claim 1, wherein the outer wall of the collar has a continuous substantially oval cross-section.

6. The excess flow valve assembly according to claim 1, wherein the outer wall of the collar has a continuous substantially triangular cross-section.

7. The excess flow valve assembly according to claim 1, wherein the collar is fabricated from metal.

8. The excess flow valve assembly according to claim 7, wherein the metal comprises one of steel, stainless steel, copper, brass and aluminum.

9. An excess flow valve assembly comprising:
a gas pipe having an outside surface and an inner diameter;
an excess flow valve adapted to be inserted into the gas pipe; and
a collar having a length that is less than a length of the gas pipe and an outer wall with an inside surface defining a hollow center portion configured to fit around the outside surface of a portion of the gas pipe, the outer wall being deformable so that when deformed the outside surface of the gas pipe in contact with an inside surface of the outer wall of the collar is reduced causing the inner diameter of the gas pipe to reduce so as to provide a positive stop for the excess flow valve when the excess flow valve is inserted in the gas pipe.

10. The excess flow valve assembly according to claim 9, wherein the outer wall of the collar has a continuous substantially circular cross-section.

11. The excess flow valve assembly according to claim 9, wherein the outer wall of the collar has a discontinuous circular cross-section.

12. The excess flow valve assembly according to claim 9, wherein the outer wall of the collar has at least one flat wall and at least one curved wall.

13. The excess flow valve assembly according to claim 9, wherein the outer wall of the collar has a continuous substantially oval cross-section.

14. The excess flow valve assembly according to claim 9, wherein the outer wall of the collar has a continuous substantially triangular cross-section.

15. An excess flow valve assembly comprising:
a gas pipe having a predefined length with a first end and a second end, an outer diameter and an inner diameter;
an excess flow valve adapted to fit within the inner diameter of the gas pipe; and
a collar positioned on the gas pipe between the first end and the second end, the collar having a length that is less than the predefined length of the gas pipe and an outer wall with an inside surface defining a hollow center portion configured to fit over the outside diameter of the gas pipe, the outer wall being deformable so that when deformed the inner diameter of the gas pipe is deformed inwardly reducing the inner diameter of a length of gas pipe in contact with the collar to prevent the excess flow valve from exiting the first end or the second end of the gas pipe.

16. The excess flow valve assembly according to claim 15, wherein the outer wall of the collar has a continuous substantially circular cross-section.

17. The excess flow valve assembly according to claim 15, wherein the outer wall of the collar has a discontinuous circular cross-section.

18. The excess flow valve assembly according to claim 15, wherein the outer wall of the collar has at least one flat wall and at least one curved wall.

19. The excess flow valve assembly according to claim 15, wherein the outer wall of the collar has a continuous substantially oval cross-section.

20. The excess flow valve assembly according to claim 15, wherein the outer wall of the collar has a continuous substantially triangular cross-section.

* * * * *